US009656242B2

(12) United States Patent
Lee et al.

(10) Patent No.: US 9,656,242 B2
(45) Date of Patent: May 23, 2017

(54) METHOD FOR PREPARING A SUPER ABSORBENT POLYMER

(71) Applicant: LG Chem, Ltd., Seoul (KR)

(72) Inventors: Yong Hun Lee, Daejeon (KR); Chang Sun Han, Daejeon (KR); Sang Gi Lee, Daejeon (KR); Mi Young Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/912,563

(22) PCT Filed: Sep. 30, 2014

(86) PCT No.: PCT/KR2014/009201
§ 371 (c)(1),
(2) Date: Feb. 17, 2016

(87) PCT Pub. No.: WO2015/047029
PCT Pub. Date: Apr. 2, 2015

(65) Prior Publication Data
US 2016/0207026 A1 Jul. 21, 2016

(30) Foreign Application Priority Data
Sep. 30, 2013 (KR) .................. 10-2013-0116679
Sep. 30, 2014 (KR) .................. 10-2014-0130847

(51) Int. Cl.
| | | |
|---|---|---|
| B01J 20/32 | (2006.01) | |
| B01J 20/30 | (2006.01) | |
| C08F 20/10 | (2006.01) | |
| C08J 3/24 | (2006.01) | |
| B01J 20/26 | (2006.01) | |
| B01J 20/28 | (2006.01) | |

(52) U.S. Cl.
CPC ......... *B01J 20/3085* (2013.01); *B01J 20/261* (2013.01); *B01J 20/28004* (2013.01); *C08F 20/10* (2013.01); *C08J 3/24* (2013.01); *C08J 3/245* (2013.01); *C08J 2333/02* (2013.01); *C08J 2433/12* (2013.01)

(58) Field of Classification Search
CPC ........................................................ B01J 20/32
USPC ........................................................ 502/402
See application file for complete search history.

(56) References Cited

U.S. PATENT DOCUMENTS

| | | | |
|---|---|---|---|
| 4,446,261 A | 5/1984 | Yamasaki et al. | |
| 4,734,478 A | 3/1988 | Tsubakimoto et al. | |
| 5,140,076 A | 8/1992 | Hatsuda et al. | |
| 2003/0014027 A1 | 1/2003 | Beihoffer et al. | |
| 2003/0219600 A1 | 11/2003 | Mitchell et al. | |
| 2005/0043696 A1 | 2/2005 | Schmidt et al. | |
| 2005/0065237 A1 | 3/2005 | Schmidt et al. | |
| 2005/0209352 A1 | 9/2005 | Dairoku et al. | |
| 2007/0276061 A1 | 11/2007 | Tanaka et al. | |
| 2008/0234420 A1 | 9/2008 | Smith et al. | |
| 2009/0131255 A1 | 5/2009 | Ikeuchi et al. | |
| 2010/0119312 A1 | 5/2010 | Nagashima et al. | |
| 2010/0261812 A1 | 10/2010 | Qin et al. | |

FOREIGN PATENT DOCUMENTS

| | | |
|---|---|---|
| JP | S56161408 A | 12/1981 |
| JP | S57158209 A | 9/1982 |
| JP | S57198714 A | 12/1982 |
| JP | 06298876 | 10/1994 |
| JP | 2003534450 A | 11/2003 |
| JP | 2007501315 A | 1/2007 |
| JP | 4860470 B2 | 1/2012 |
| JP | 4926474 B2 | 5/2012 |
| KR | 20100014556 A | 2/2010 |
| KR | 101154568 | 6/2012 |
| WO | 2008120742 A1 | 10/2008 |

OTHER PUBLICATIONS

Buchholz, F.L. and Graham, A.T., "Modern Superabsorbent Polymer Technology," John Wiley & Sons(1998), p. 161.
Reinhold Schwalm, UV Coatings, Basics, Recent Developments and New Applications, Elsevier Science, Dec. 21, 2006.
John Wiley & Sons, Principles of Polymerization, Second Edition, p. 203, 1981.
International Search Report for Application No. PCT/KR2014/009201 dated Jan. 8, 2015.
Extended search report from European Application No. 14849295.2, dated Feb. 2, 2017.

*Primary Examiner* — Edward Johnson
(74) *Attorney, Agent, or Firm* — Lerner, David, Littenberg, Krumholz & Mentlik, LLP

(57) ABSTRACT

The present invention relates to a method for preparing a super absorbent polymer. The method for preparing a super absorbent polymer according to the present invention comprises the steps of: preparing a hydrogel polymer by carrying out a thermal polymerization or a photopolymerization of a monomer composition including a water-soluble ethylene-based unsaturated monomer and a polymerization initiator; drying the hydrogel polymer; pulverizing the dried polymer; mixing the pulverized polymer with a surface crosslinking agent and a polymer particle having a core-shell structure; and carrying out a surface crosslinking reaction. According to the present invention, the super absorbent polymer having improved permeability can be obtained by adding the polymer particle during surface crosslinking.

9 Claims, No Drawings

METHOD FOR PREPARING A SUPER ABSORBENT POLYMER

CROSS-REFERENCE TO RELATED APPLICATION

The present application is a national phase entry under 35 U.S.C. §371 of International Application No. PCT/KR2014/009201 filed Sep. 30, 2014 which claims priority from Korean Patent Application No. 10-2013-0116679, filed on Sep. 30, 2013, and Korean Patent Application No. 10-2014-0130847, filed on Sep. 30, 2014, all of which are incorporated herein by reference.

BACKGROUND OF THE INVENTION (a) Field of the Invention

The present invention relates to a method for preparing a super absorbent polymer. More specifically, the present invention relates to a method for preparing a super absorbent polymer having improved permeability by adding a polymer particle during surface crosslinking.

(b) Description of the Related Art

Super absorbent polymer (SAP) is a synthetic polymer material having a function capable of absorbing moisture from about 500 to about 1,000 times of its own weight. Each manufacturer has denominated it as different names such as SAM (Super Absorbency Material), AGM (Absorbent Gel Material) or the like. Such super absorbent polymers started to be practically applied in sanitary products, and now they have been widely used not only for hygiene products such as disposable diapers for children, etc., but also for water retaining soil products for gardening, water stop materials for the civil engineering and construction, sheets for raising seedling, fresh-keeping agents for food distribution fields, materials for poultice or the like.

As a method for preparing a super absorbent polymer, an inverse suspension polymerization method, an aqueous solution polymerization method or the like are known. For example, the inverse suspension polymerization is disclosed in Japanese Patent Publication Nos. Sho56-161408, Sho57-158209, Sho57-198714, and so on. Furthermore, the aqueous solution polymerization method, such as a thermal polymerization method in which a polymer gel is polymerized while being broken and cooled in a kneader equipped with a plurality of spindles, and a photo polymerization method in which an aqueous solution with a high concentration is irradiated with UV rays or the like onto a belt to carry out the polymerization and drying at the same time are known.

The hydrogel polymer obtained through said polymerization reaction is generally marketed as a powdered product after it is dried and pulverized.

In a product using the super absorbent polymer, the permeability is an index for measuring a fluidity of a liquid to be absorbed. The permeability may vary depending on characteristics such as a particle size distribution of a crosslinked resin, a shape of the particle and a connectivity of the openings between the particles, a surface modification of a swollen gel and the like. The fluidity of the liquid passing through the swollen particles may change depending on the permeability of a super absorbent polymer composition. When the permeability is low, it does not enable the liquid to easily flow through the super absorbent polymer composition.

One method for increasing a permeability of the super absorbent resin may include, for example, a method for polymerizing a resin and then carrying out a surface crosslinking reaction. In this case, a method of adding silica, clay or the like together with a surface crosslinking agent has been utilized. For example, U.S. Pat. Nos. 5,140,076 and 4,734,478 disclose the addition of silica during surface crosslinking of a dried super absorbent polymer powder.

However, there were problems in that the permeability is improved due to the addition of silica, clay or the like, but it shows that a water holding capacity and an absorption power under pressure are decreasing in proportion thereto, and it is easy to be separated from the super absorbent polymer by external physical impact during movement.

SUMMARY OF THE INVENTION

For resolving the aforesaid problems of the prior arts, it is an object of the present invention to provide a method for preparing a super absorbent polymer having improved permeability by adding a polymer particle during surface crosslinking.

To achieve the above object, the present invention provides a method for preparing a super absorbent polymer, comprising the steps of: carrying out a thermal polymerization or a photopolymerization of a monomer composition including a water-soluble ethylene-based unsaturated monomer and a polymerization initiator to form a hydrogel polymer; drying the hydrogel polymer; pulverizing the dried polymer; mixing the pulverized polymer with a surface crosslinking agent and a polymer particle having a core-shell structure; and carrying out a surface crosslinking reaction.

According to the preparation method of the present invention, it is possible to obtain a super absorbent polymer having improved physical properties, without decreasing a water holding capacity and an absorption power under pressure, while having improved permeability.

DETAILED DESCRIPTION OF THE EMBODIMENTS

While the present invention is susceptible to various modifications and alternative forms, specific embodiments will be illustrated and described in detail as follows. It should be understood, however, that the description is not intended to limit the present invention to the particular forms disclosed herein, but the intention is to cover all modifications, equivalents, and replacements falling within the spirit and scope of the invention.

Hereinafter, the method for preparing a super absorbent polymer according to an embodiment of the present invention will be described in detail.

The method for preparing a super absorbent polymer according to the present invention comprises the steps of: carrying out a thermal polymerization or a photopolymerization of a monomer composition including a water-soluble ethylene-based unsaturated monomer and a polymerization initiator to form a hydrogel polymer; drying the hydrogel polymer; pulverizing the dried polymer; mixing the pulverized polymer with a surface crosslinking agent and a polymer particle having a core-shell structure; and carrying out a surface crosslinking reaction.

In the method for preparing a super absorbent polymer according to the present invention, the monomer composition, the raw material of the super absorbent polymer, includes a water-soluble ethylene-based unsaturated monomer and a polymerization initiator.

As the water-soluble ethylene-based unsaturated monomer, any monomer that is generally used in the preparation of the super absorbent polymer may be used without limitation. For example, one or more monomers selected from the group consisting of an anionic monomer and a salt thereof, a nonionic hydrophilic monomer, and an unsaturated monomer containing amino group and a quaternary compound thereof may be used.

Specifically, one or more compounds selected from the group consisting of an anionic monomer such as (meth) acrylic acid, maleic anhydride, fumalic acid, crotonic acid, itaconic acid, 2-acryloylethane sulfonic acid, 2-methacryloylethane sulfonic acid, 2-(meth)acryloylpropane sulfonic acid, or 2-(meth)acrylamide-2-methyl propane sulfonic acid, and a salt thereof; a nonionic hydrophilic monomer such as (meth)acrylamide, N-substituted(meth)acrylate, 2-hydroxyethyl(meth)acrylate, 2-hydroxypropyl(meth)acrylate, methoxypolyethyleneglycol(meth)acrylate, or polyethyleneglycol(meth)acrylate; and an unsaturated monomer containing amino group such as (N,N)-dimethylaminoethyl (meth)acrylate or (N,N)-dimethylaminopropyl(meth) acrylate, and a quaternary compound thereof may be used.

More preferably, acrylic acid or a salt thereof, for example, acrylic acid or an alkali metal salt thereof such as sodium acrylate, may be used. By using such monomer, it becomes possible to prepare a super absorbent polymer having superior physical properties. In the case where the alkali metal salt of acrylic acid is used as the monomer, it is possible to use acrylic acid after neutralizing the same with a basic compound such as sodium hydroxide (NaOH).

The concentration of the water-soluble ethylene-based unsaturated monomer may be about 20% to about 60% by weight, preferably about 40% to about 50% by weight, based on the monomer composition including the raw materials of the super absorbent polymer and the solvent, and it may be controlled to be an adequate concentration in consideration of the polymerization time and the reaction conditions. However, when the concentration of the monomer is excessively low, the yield of the super absorbent polymer is low and there may be a problem in economic efficiency. In contrast, when the concentration is excessively high, it may cause problems in processes that some of the monomer may be extracted or the pulverization efficiency of the prepared hydrogel polymer appears low in the pulverizing process, and thus the physical properties of the super absorbent polymer may decrease.

In the preparation method of the super absorbent polymer according to the present invention, the polymerization initiator used during the polymerization is not particularly limited as long as it is generally used in the preparation of the super absorbent polymer.

Specifically, the polymerization initiator that can be used herein includes a thermal polymerization initiator or a photopolymerization initiator by UV irradiation, depending on the polymerization method. However, even in the case of using the photopolymerization method, because a certain amount of heat is generated by the ultraviolet irradiation or the like and a certain degree of heat is generated according to the progress of the exothermic polymerization reaction, a thermal polymerization initiator may be additionally included.

The photopolymerization initiator can be used without any limitation as long as it is a compound capable of forming a radical by a light such as an UV ray.

The photopolymerization initiator, for example, may include one or more initiators selected from the group consisting of a benzoin ether, a dialkyl acetophenone, a hydroxyl alkylketone, a phenyl glyoxylate, a benzyl dimethyl ketal, an acyl phosphine, and an α-aminoketone. Meanwhile, specific examples of the acyl phosphine may include normal lucirin TPO, namely, 2,4,6-trimethyl-benzoyl-trimethyl phosphine oxide. More various photopolymerization initiators are well disclosed in "UV Coatings: Basics, Recent Developments and New Application" written by Reinhold Schwalm, (Elsevier, 2007), p 115, however the photopolymerization initiator is not limited to the above-described examples.

The photopolymerization initiator may be included in the concentration of about 0.01% to about 1.0% by weight based on the monomer composition. When the concentration of the photopolymerization initiator is excessively low, the polymerization rate may become slow, and when the concentration of the photopolymerization initiator is excessively high, the molecular weight of the super absorbent polymer becomes small and its physical properties may become uneven.

And, as the thermal polymerization initiator, one or more initiators selected from the group consisting of a persulfate-based initiator, an azo-based initiator, hydrogen peroxide, and ascorbic acid may be used. Specific examples of the persulfate-based initiator may include sodium persulfate ($Na_2S_2O_8$), potassium persulfate ($K_2S_2O_8$), ammonium persulfate (($NH_4)_2S_2O_8$), and the like; and examples of the azo-based initiator may include 2,2-azobis(2-amidinopropane)dihydrochloride, 2,2-azobis-(N,N-dimethylene)isobutyramidine dihydrochloride, 2-(carbamoylazo)isobutylonitrile, 2,2-azobis [2-(2-imidazolin-2-yl)propane] dihydrochloride, 4,4-azobis-(4-cyanovaleric acid) and the like. More various thermal polymerization initiators are well disclosed in "Principle of Polymerization" written by Odian, (Wiley, 1981), p 203, however the thermal polymerization initiator is not limited to the above-described examples.

The thermal polymerization initiator may be included in the concentration of about 0.001% to about 0.5% by weight based on the monomer composition. When the concentration of the thermal polymerization initiator is excessively low, the additional thermal polymerization hardly occurs and thus effects due to the addition of the thermal polymerization initiator may be insignificant, and when the concentration of the thermal polymerization initiator is excessively high, the molecular weight of the super absorbent polymer becomes small and the physical properties may become uneven.

According to one embodiment of the present invention, the monomer composition may further include an internal crosslinking agent as the raw material of the super absorbent polymer. The internal crosslinking agent may include a crosslinking agent having one or more ethylene-based unsaturated functional groups in addition to one or more functional groups capable of reacting with the water-soluble substituents of the water-soluble ethylene-based unsaturated monomer; or a crosslinking agent having two or more functional groups capable of reacting with the water-soluble substituents of the monomer and/or the water-soluble substituents formed by hydrolysis of the monomer.

Specific examples of the internal crosslinking agent may include a $C_8$-$C_{12}$ bisacrylamide, bismethacrylamide, a poly (meth)acrylate of $C_2$-$C_{10}$ polyol, or a poly(meth)allylether of $C_2$-$C_{10}$ polyol, and so on may be used, and more specifically, one or more agents selected from the group consisting of N,N'-methylenebis(meth)acrylate, ethyleneoxy(meth)acrylate, polyethyleneoxy(meth)acrylate, propyleneoxy(meth) acrylate, glycerin diacrylate, glycerin triacrylate, trimethylol triacrylate, triallylamine, triarylcyanurate, triallylisocyanate, polyethyleneglycol, diethyleneglycol, and propyleneglycol may be used.

Such internal crosslinking agent may be included in the concentration of about 0.01% to about 0.5% by weight based on the monomer composition and can cross-link the polymerized polymer.

In the preparation method of the present invention, the monomer composition of the super absorbent polymer may further include additives such as a thickener, a plasticizer, a preservation stabilizer, an antioxidant, and so on, as needed.

The raw materials such as the water-soluble ethylene-based unsaturated monomer, the photopolymerization initiator, the thermal polymerization initiator, the internal crosslinking agent, and the additives may be prepared in the form of the monomer composition solution which is dissolved in a solvent.

In this case, the solvent can be used without any limitation as long as it can dissolve the above-described components. For example, one or more solvents selected from the group consisting of water, ethanol, ethyleneglycol, diethyleneglycol, triethyleneglycol, 1,4-butanediol, propyleneglycol, ethyleneglycol monobutylether, propyleneglycol monomethylether, propyleneglycol monomethylether acetate, methylethylketone, acetone, methylamylketone, cyclohexanone, cyclopentanone, diethyleneglycol monomethylether, diethyleneglycol ethylether, toluene, xylene, butylolactone, carbitol, methylcellosolve acetate, and N,N-dimethyl acetamide, and so on may be used alone or in combination with each other.

The solvent may be included in a residual amount of excluding the above-described components from the total weight of the monomer composition.

Meanwhile, the method for preparing a hydrogel polymer by the thermal polymerization or photopolymerization of the monomer composition is not particularly limited as long as it is a method typically used in the art.

Specifically, the polymerization method is largely classified into a thermal polymerization and a photopolymerization depending on the polymerization energy source. The thermal polymerization may be typically carried out in a reactor like a kneader equipped with agitating spindles, and the photopolymerization may be carried out in a reactor equipped with a movable conveyor belt. However, the above-described polymerization method is an example only, and the present invention is not limited thereto.

For example, as described above, the thermal polymerization is carried out by supplying hot air to a reactor like a kneader equipped with the agitating spindles or by heating the reactor, thereby obtaining a hydrogel polymer. The resulting hydrogel polymer may have a size of centimeters or millimeters when it is discharged from the outlet of the reactor, depending on the type of the agitating spindles equipped in the reactor. Specifically, the size of the hydrogel polymer may vary depending on the concentration of the monomer composition injected thereto, the injection rate or the like, and the hydrogel polymer having a weight average particle diameter of 2 mm to 50 mm can be generally obtained.

Furthermore, when the photopolymerization is carried out in a reactor equipped with a movable conveyor belt, the form of the hydrogel polymer obtained may be usually a sheet-like hydrogel polymer having a width of the belt. In this case, the thickness of the polymer sheet may vary depending on the concentration of the monomer composition injected thereto and the injection rate. However, typically it is preferable to supply the monomer composition so that the sheet-like polymer having a thickness of about 0.5 cm to about 5 cm can be obtained. When the monomer composition is supplied so that the thickness of the sheet-like polymer becomes too thin, it is not preferred because the production efficiency is low. When the thickness of the sheet-like polymer exceeds 5 cm, the polymerization reaction may not uniformly occur throughout the whole thickness due to its excessively thick thickness.

The hydrogel polymer obtained by such method may have typically a moisture content of about 40% to about 80% by weight. Meanwhile, the term "moisture content" as used herein refers to the content of moisture in the total weight of the hydrogel polymer, which is obtained by subtracting the weight of the dried polymer from the weight of the hydrogel polymer. Specifically, it is defined as a value calculated by measuring the weight loss according to evaporation of water in the polymer during the drying process of increasing the temperature of the polymer through infrared heating. In this case, the moisture content is measured under the drying conditions where the temperature is increased from room temperature to 180° C. and then the temperature is maintained at 180° C., and the total drying time is set to 20 minutes, including 5 minutes for the temperature rising step.

Subsequently, a step of drying the hydrogel polymer thus obtained is carried out.

In this case, in order to increase the efficiency of the drying step, a coarsely pulverizing step may be further carried out before drying, as needed.

A pulverizing machine used herein may include, but its configuration is not limited to, for example, any one selected from the group consisting of a vertical pulverizer, a turbo cutter, a turbo grinder, a rotary cutter mill, a cutter mill, a disc mill, a shred crusher, a crusher, a chopper, and a disc cutter. However, it is not limited to the above-described examples.

In this case, the pulverizing step may be carried out so that the particle diameter of the hydrogel polymer becomes about 2 mm to about 10 mm.

Pulverizing the hydrogel polymer into a particle diameter of less than 2 mm is technically not easy due to its high moisture content, and agglomeration may occur between the pulverized particles. Meanwhile, if the polymer is pulverized into a particle diameter of greater than 10 mm, the effect of increasing the efficiency in the subsequent drying step may be insignificant.

The hydrogel polymer pulverized as above or the hydrogel polymer immediately after polymerization without the pulverizing step is subjected to a drying step. In this case, the drying temperature of the drying step may be about 150° C. to about 250° C. When the drying temperature is less than 150° C., it is likely that the drying time becomes too long or the physical properties of the super absorbent polymer finally formed is deteriorated, and when the drying temperature is higher than 250° C., only the surface of the polymer is dried, and thus it is likely that fine powder is generated during the subsequent pulverizing step and the physical properties of the super absorbent polymer finally formed is deteriorated. Therefore, the drying step may be preferably carried out at a temperature of about 150° C. to about 200° C., and more preferably at a temperature of about 160° C. to about 180° C.

Meanwhile, the drying time may be about 20 to about 90 minutes, in consideration of the process efficiency, but it is not limited thereto.

In the drying step, the drying method may also be selected and used without any limitation if it is a method generally used for drying the hydrogel polymer. Specifically, the drying step may be carried out by a method such as hot air supply, infrared irradiation, microwave irradiation or ultraviolet irradiation. When the drying step as above is finished, the moisture content of the polymer may be about 0.1% to about 10% by weight.

Subsequently, the dried polymer obtained through the drying step is subjected to a pulverization step.

The polymer powder obtained through the pulverizing step may have a particle diameter of about 150 μm to about 850 μm. Specific examples of a pulverizing device that can be used to achieve the above particle diameter may include a pin mill, a hammer mill, a screw mill, a roll mill, a disc mill, a jog mill or the like, but the present invention is not limited thereto.

Also, in order to control the physical properties of the super absorbent polymer powder finally commercialized after the pulverization step, a separate step of classifying the polymer powder obtained after the pulverization depending on the particle diameter may be undergone. Preferably, a polymer having a particle diameter of about 150 μm to about 850 μm is classified and only the polymer powder having such a particle diameter is subjected to the surface crosslinking reaction and finally commercialized.

Next, to the pulverized polymer, a surface crosslinking agent and a polymer particle are added and mixed. Then, the pulverized polymer is subjected to the surface croslinining reaction by heating the mixture.

The surface crosslinking is a step of increasing the crosslinking density near the surface of the super absorbent polymer particles related to the crosslinking density inside the particles. In general, the surface crosslinking agent is applied to the surface of the super absorbent polymer particle. Therefore, this reaction occurs on the surface of the super absorbent polymer particle, which improves crosslinking properties on the surface of the particle without substantially affecting the inside of the particle. Thus, the surface-crosslinked super absorbent polymer particles have a higher level of crosslinking near the surface than in the inside.

In the prior arts, a method of adding a porous silica or clay and the like in addition to the surface crosslinking agent was used to increase the permeability. However, the above-mentioned silica or clay and the like have a porosity and thus the permeability is improved by the addition thereof, but it shows that a water holding capacity and an absorption powder under pressure are decreasing in proportion thereto, and the physical bonding with the super absorbent polymer is not strong and thus it is easy to be separated from the super absorbent polymer by external physical impact during movement.

However, in the preparation method of the present invention, the surface crosslinking reaction can be carried out by adding a polymer particle having a core-shell structure together with a surface crosslinking agent, thereby exhibiting the effect of improving the permeability without decreasing a water holding capacity and an absorption powder under pressure.

The above polymer particle is not subjected to a direct surface crosslinking reaction, but it may be physically and/or chemically bonded to the surface of the pulverized polymer. Thus, in the case where the super absorbent polymer is prepared by a polymer in which the polymer particle is bonded on the surface, when the super absorbent polymer is swollen by absorbing water, it can prevent the swollen particles from being agglomerated or aggregated with each other in response to increased pressure, thereby having improved liquid permeability.

According to one embodiment of the present invention, the polymer particle has a core-shell structure. In the core-shell structure, the core portion includes a polymer having a relatively low glass transition temperature and the shell portion may be in the form wherein a polymer having a higher glass transition temperature than the polymer of the core portion is absorbed, entangled or grafted. For example, the polymer of the shell portion may have a higher glass transition temperature of at least about 1° C., preferably at least about 10° C., and more preferably at least about 20° C., as compared to the polymer of the core portion.

According to one embodiment of the present invention, in particular the polymer particle having an average particle diameter of about 0.01 μm to about 10 μm, preferably about 0.01 μm to about 5 μm and more preferably about 0.01 μm to about 1 μm can be used. When the average particle size of the polymer particle is within the above range, the effects of improving a liquid permeability without decreasing a water holding capacity and an absorption power under pressure of the super absorbent polymer can be more optimized and exerted.

According to one embodiment of the present invention, the polymer particle may include, for example, one or more selected from the group consisting of (meth)acrylate-based, (meth)acrylic acid-based, styrene-based, and diene-based polymers, but is not limited thereto. For example, the polymer particle may include (co)polymer of monomers such as a lower alkyl acrylate such as ethyl acrylate, propyl acrylate, isopropyl acrylate, butyl acrylate, 2-ethylhexyl acrylate, octyl acrylate, or a mixture thereof, methyl methacrylate; or (co)polymer of monomers such as alkyl acrylate such as ethyl acrylate and butyl acrylate, methacrylate, styrene, methacrylic acid, acrylonitrile, alpha-methylstyrene, beta-methyl styrene, para-methyl styrene, 1,3-butadiene, 1,2-butadiene and isoprene. Moreover, in the polymer particle, the polymer forming the core portion and the polymer forming the shell portion may be the same or different materials, and the polymer of the core portion can be produced in a crosslinked form.

The weight average molecular weight of the polymer particle is not particularly limited. However, for example, a polymer having a weight average molecular weight of greater than 5,000 g/mol preferably about 10,000 to about 1,500,000 g/mol, and more preferably about 100,000 to about 1,200,000 g/mol may be used.

The content of the polymer particles may be about 0.001 to about 2 parts by weight, preferably from about 0.0025 to about 1 part by weight and more preferably 0.005 to about 0.5 parts by weight, based on 100 parts by weight of the polymer. When the content of the polymer particle is excessively low, it hardly shows the effect of improving the permeability due to the addition of the polymer particle. When the content exceeds 2 parts by weight based on 100 parts by weight of the polymer, it may cause a reduction in the other physical properties such as the water holding capacity and the absorption power under pressure.

The polymer particle can be added in the form of latex or emulsion which is dispersed in a solvent such as water, and the form of the particle is not particularly limited, but a substantially spherical particle can be used.

Meanwhile, in the step of mixing the pulverized polymer with a surface crosslinking agent and the polymer particle of the present invention, the pulverized polymer and the surface crosslinking agent are preferably mixed under temperature conditions which are lower than the glass transition temperature (Tg) of the polymer forming the shell portion of the polymer particle. For example, in the step of adding the polymer particle, the pulverized polymer and the surface crosslinking agent can be mixed by adjusting their temperature to at least about 1° C., preferably at least about 5° C., and more preferably at least about 10° C. which is lower the glass transition temperature (Tg) of the polymer forming the shell portion of the polymer particle. As described above, when the temperature of the pulverized polymer and the surface crosslinking agent is lower than the glass transition temperature of the polymer forming the shell portion of the polymer particle, the polymer particle may be evenly distributed on the surface of the pulverized polymer particle, and when the temperature of the pulverized polymer is higher than the glass transition temperature of the polymer forming the shell portion of the polymer particle, it is likely that the polymer particle is locally adhered to the polymer, and uniform dispersion is difficult and the permeability after the surface crosslinking reaction may be decreased.

The method for adding the surface crosslinking agent and the polymer particle to the polymer powder is not limited in its constitution. The surface crosslinking agent, the polymer particle and the polymer powder are added to a reaction vessel, and then mixed, or a method of spraying the surface crosslinking agent and the polymer particle on the polymer powder, a method of continuously supplying the polymer, the surface crosslinking agent and the polymer particle in a mixer continuously operated and mixing them, and the like can be used.

When the surface crosslinking agent and the polymer particle are added, they may be added in the form of a surface crosslinking solution by further mixing together with water. When water is added, there is an advantage that the surface crosslinking agent and the polymer particle can be uniformly dispersed in the polymer. Herein, water is preferably added at a ratio of about 1 to about 10 parts by weight based on 100 parts by weight of the polymer, for the purpose of inducing a uniform distribution of the surface crosslinking agent and the polymer particle and preventing the agglomeration of the polymer powder, while optimizing the depth of the penetration from the surface of the crosslinking agent and the polymer particle.

Further, the surface crosslinking agent is not particularly limited as long as it is a compound capable of reacting with functional groups of the polymer.

In order to improve the properties of the produced super absorbent polymer, one or more selected from the group consisting of a polyhydric alcohol compound; an epoxy compound; a polyamine compound; a haloepoxy compound; a condensation product of the haloepoxy compound; an oxazoline compound; a mono-, di- or polyoxazolidinone compound; acyclic urea compound; a polyvalent metal salt; and an alkylene carbonate compound may be preferably used as the surface crosslinking agent.

Specific examples of the polyhydric alcohol compound may include one or more selected from the group consisting of a mono-, di-, tri-, tetra- or polyethylene glycol, monopropylene glycol, 1,3-propanediol, dipropylene glycol, 2,3,4'-trimethyl-1,3-pentanediol, polypropylene glycol, glycerol, polyglycerol, 2-butene-1,4-diol, 1,4-butanediol, 1,3-butanediol, 1,5-pentanediol, 1,6-hexanediol, and 1,2-cyclohexane dimethanol.

Further, the epoxy compound may include ethylene glycol diglycidyl ether, glycidol and the like. The polyamine compound may include one or more selected from the group consisting of ethylene diamine, diethylene triamine, triethylene tetraamine, tetraethylene pentamine, pentaethylene hexamine, polyethylene imine, and polyamide polyamine.

Further, the haloepoxy compound may include epichlorohydrin, epibromohydrin, or α-methylephichlorohydrin.

Meanwhile, the mono-, di-, or polyoxazolidinone compound may include, for example, 2-oxazolidinone and the like.

Further, the alkylene carbonate compound may include ethylene carbonate and the like. These may be used alone or in combination with each other. On the other hand, to increase the efficiency of the surface crosslinking process, among these surface crosslinking agents, one or more of polyhydric alcohols having 2 to 10 carbon atoms may be used.

The amount of the surface crosslinking agent added may be suitably selected depending on the kind of the surface crosslinking agent added or the reaction conditions. However, the surface crosslinking agent may be typically used in an amount of about 0.001 to about 5 parts by weight, preferably about 0.01 to about 3 parts by weight, and more preferably about 0.05 to about 2 parts by weight, based on 100 parts by weight of the polymer.

When the amount of the surface crosslinking agent used is excessively small, the surface crosslinking reaction hardly occurs, and when the amount is higher than 5 parts by weight based on 100 parts by weight of the polymer, the absorptivity and the physical properties may be decreased due to excessive surface crosslinking reaction.

The super absorbent polymer obtained in accordance with the preparation method of the present invention prevents the swollen polymer particles from being agglomerated with each other by distribution of the polymer particle on the surface, thereby having improved permeability. Also, unlike the case where silica or clay is added in the prior art, the super absorbent polymer according to the preparation method of the present invention can minimize a reduction in the physical properties of the super absorbent polymer such as a water holding capacity and an absorption power under pressure and have a relatively strong physical bonding with the polymer resin and thus, reduce generation of a phenomenon of separation due to impact during movement. Therefore, less deviation of physical properties occurs even during long-term transportation and storage.

Further, in the super absorbent polymer obtained in accordance with the preparation method of the present invention, the polymer particles can be uniformly distributed on the surface of the super absorbent polymer to form a polymer domain of less than 10 μm. The polymer domain refers to a form that is distributed on the super absorbent polymer matrix to have a predetermined shape and size. When observing the surface of the super absorbent polymer obtained according to the preparation method of the present invention in a scanning electron microscope (SEM), it can be observed that the polymer particles are uniformly distributed on the surface of the super absorbent polymer to form domains. Thus, the polymer particles form domains on the surface of the super absorbent polymer and prevent the super absorbent polymer particles from being aggregated or agglomerated with each other in response to the increased pressure when the super absorbent polymer is swollen, thereby having improved permeability without decreasing a water holding capacity and an absorption power under pressure.

The super absorbent polymer obtained in accordance with the preparation method of the present invention has a permeability of about 60 seconds or less, preferably about 50 seconds or less and more preferably about 40 seconds or less.

The permeability is an index representing how well salt water (0.9% NaCl aqueous solution) absorbs a swollen super absorbent polymer. In accordance with the method described in the literature (Buchholz, F. L. and Graham, A. T., "Modern Superabsorbent Polymer Technology," John Wiley & Sons (1998), page 161), the permeability is evaluated by swelling 0.2 g of the super absorbent polymer powder for 30 minutes, applying the swollen polymer to a pressure of 3 psi and then measuring the time required to permeate 0.9% saline solution.

The super absorbent polymer obtained in accordance with the preparation method of the present invention may have a saline flow conductivity (SFC) of about 30 $cm^3*sec*10^{-7}/g$ or more, about 40 $cm^3*sec*10^{-7}/g$ or more, and preferably about 50 $cm^3*sec*10^{-7}/g$ or more.

The saline flow conductivity (SFC) can be measured according to the method disclosed in [0184]-[0189] in column 16 of US Patent Publication No. 2009-0131255.

The super absorbent polymer obtained in accordance with the preparation method of the present invention may have a free swell gel bed permeability (GBP) of about $15*10^{-9}$ $cm^2$ or more, about $20*10^{-9}$ $cm^2$ or more, and preferably about $30*10^{-9}$ $cm^2$ or more.

The free swell gel bed permeability (GBP) may be measured according to the method disclosed in [0065] in column 6 through [0077] in column 7 of US Patent Publication No. 2010-0261812.

The super absorbent polymer powder obtained in accordance with the preparation method of the present invention has a water holding capacity measured according to the EDANA WSP 241.2 method of about 25 to about 35 g/g, preferably about 28 to about 33 g/g, and an absorption power under pressure measured according to the EDANA WSP 241.2 method of about 17 to about 27 g/g, preferably about 20 to about 26 g/g, which show excellent water holding capacity and absorption power under pressure.

The crosslinking reaction and the drying process may be carried out simultaneously by heating the surface crosslinking agent and the polymer particle at a temperature of about 140° C. to about 220° C., preferably about 160° C. to about 200° C. for about 15 to about 90 minutes, preferably about 20 to about 80 minutes. When the crosslinking reaction temperature is less than 140° C., the surface crosslinking reaction and the reaction of polymer particles may not occur, and when the crosslinking reaction temperature exceeds 220° C., foreign substances and odors may occur due to carbonization, or due to the excessive reaction, physical properties can be deteriorated and stable operation conditions cannot be ensured. Further, when the crosslinking reaction time is extremely short, less than 15 minutes, it is not possible to carry out a sufficient crosslinking reaction. When the crosslinking reaction time exceeds 90 minutes, an excessive surface crosslinking reaction can occur and thus the physical properties may be deteriorated due to the impact of the polymer particles.

The temperature elevating means for the surface crosslinking reaction is not particularly limited and may include applying a heat transfer medium or directly applying a heat source. In this case, examples of the heat transfer medium used herein may include, but are not limited to, any heated fluid, such as steam, hot air, or hot oil. And, the temperature of the heat transfer medium may be property regulated in consideration of the means for the heat transfer medium, the heating rate, and the desired heating temperature. Examples of the heat source directly provided may include, but are not limited to, electricity or gas.

As described above, the super absorbent polymer powder obtained in accordance with the preparation method of the present invention has improved permeability by using a large number of fine passages as a moving path of water, and it does not occur a phenomenon of separation due to impact during movement, without a reduction in physical properties such as a water holding capacity and an absorption power under pressure, thereby showing less deviation of physical properties during long-term transportation and storage.

The present invention will be described in more detail with reference to the following Examples. However, the following Examples are for illustrative purposes only, and the present invention is not intended to be limited by these Examples.

EXAMPLES

Preparation of Super Absorbent Polymer

Preparation Example 1

200 g of ion exchanged water and 6 g of 3 wt. % sodium lauryl sulfate (SLS) solution were added to a 3 L four-neck reactor equipped with a thermometer, a nitrogen feeder, a cooler and a stirrer. Then, 3 g of styrene, 9 g of methyl methacrylate, 8 g of butyl acrylate and 0.003 g of t-dodecyl mercaptan were added inside the reactor, while stirring. Then, the temperature was raised up to 60° C. while feeding nitrogen continuously. While maintaining the temperature in the reactor to 60° C., 0.5 g of 3% potassium sulfate solution and 5 g of activator solution were added thereto to give a polymer latex after two hours. The activator solution is a solution consisting of 0.015 parts by weight of disodium ethylenediamine tetraacetate, 0.02 parts by weight of formaldehyde sodium sulfoxylate, 0.001 part by weight of ferrous sulfate, 1.165 parts by weight of ion exchanged water.

Then, 100 g of ion exchanged water, 15 g of 3 wt. % lauryl sodium sulfonate solution, 21 g of styrene, 63 g of methyl methacrylate, and 56 g of butyl acrylate were mixed to prepare a pre-emulsion. After a stabilized pre-emulsion was made, the pre-emulsion mixture was temporarily added to the same reactor that is maintained at 65° C., and simultaneously 0.1 g of 3% potassium sulphate solution and 5 g of activator solution were added thereto. After completion of the addition, the mixture was further reacted for 60 minutes to complete a core polymerization.

In order to prepare a final polymer particle, while maintaining the temperature in the reactor at 75° C., a mixture consisting of 8.1 g of styrene, 43.2 g of methyl methacrylate, 2.7 g of butyl acrylate, 0.008 g of didodexyl sodium sulfosuccinate and 0.0029 g of n-dodecyl mercaptan, and 8 g of potassium sulfate (0.5% diluted solution) were added simultaneously continuously to the reactor over 100 minutes. After completion of the addition, the mixture was further reacted for 60 minutes to complete the polymerization. Thus, a latex including a polymer particle having a core-shell structure was obtained.

The polymerization conversion ratio was 99.3% and the average particle diameter of the polymer particle was 0.1 μm. And the weight average molecular weight was 1.01 million.

Preparation Example 2

190.15 g of ion exchanged water, 0.135 g of didodecyl sodium sulfosuccinate, 0.001 g of n-dodecyl mercaptan, 5.5 g of methyl methacrylate, 3.3 g of butyl acrylate and 2.2 g of butyl methacrylate were added to a 3 L four-neck reactor equipped with a stirrer, a thermometer, a nitrogen feeder and a circulating condenser to make an emulsion. While maintaining the temperature in the reactor at 75° C. and replacing the reactor to a nitrogen atmosphere, 0.05 g of potassium sulfate was added thereto. After checking the heating temperature, the mixture was reacted for 12.0 minutes to produce a core polymer.

While maintaining the temperature in the reactor to 75° C., 77 g of methyl methacrylate, 46.2 g of butyl acrylate, 30.8 g of butyl methacrylate, 0.11 g of didodecyl sodium sulfosuccinate and 0.067 g of n-dodecylmercaptan, and 24 g of potassium sulfate (0.5% diluted solution) were added simultaneously continuously to the reactor over 340 minutes. After completion of the addition, the mixture was further reacted for 60 minutes to complete the core polymerization.

In order to prepare a final polymer particle, while maintaining the temperature in the reactor at 75° C., a mixture consisting of 38.5 g of methyl methacrylate, 8.25 g of butyl acrylate, 8.25 g of butyl methacrylate, 0.008 g of didodecyl sodium sulfosuccinate and 0.0029 g of n-dodecylmercaptan, and 8 g of potassium sulfate (0.5% diluted solution) were added simultaneously continuously to the reactor over 100 minutes. After completion of the addition, the mixture was further reacted for 60 minutes to complete the polymerization. Thus, a latex including a polymer particle having a core-shell structure was obtained.

The polymerization conversion ratio was 98.9% and the average particle diameter of the polymer particle was 0.25 μm. And the weight average molecular weight was 1.06 million.

Preparation Example 3

190.15 g of ion exchanged water, 0.03 g of didodecyl sodium sulfosuccinate, 0.001 g of n-dodecyl mercaptan, 0.1 g of sodium dicarbonate ($NaHCO_3$), 1.1 g of methyl methacrylate, 9.35 g of butyl acrylate and 0.55 g of methacrylic acid were added to a 3 L four-neck reactor equipped with a stirrer, a thermometer, a nitrogen feeder and a circulating condenser to make an emulsion. While maintaining the temperature in the reactor at 75° C. and replacing the reactor to a nitrogen atmosphere, 0.05 g of potassium sulfate was added thereto. After checking the heating temperature, the mixture was reacted for 120 minutes to produce a core polymer.

While maintaining the temperature in the reactor at 75° C., a mixture consisting of 15.4 g of methyl methacrylate, 130.9 g of butyl methacrylate, 7.7 g of methacrylic acid, 0.11 g of didodecyl sodium sulfosuccinate and 0.067 g of n-dodecylmercaptan, and 24 g of potassium sulfate (0.5% diluted solution) were added simultaneously continuously to the reactor over 340 minutes. After completion of the addition, the mixture was further reacted for 60 minutes to complete the core polymerization.

In order to prepare a final polymer particle, while maintaining the temperature in the reactor at 75° C., 16.5 g of methyl methacrylate, 35.75 g of butyl methacrylate, 2.75 g of methacrylic acid, 0.008 g didodecyl sodium sulfosuccinate and 0.0029 g of n-dodecylmercaptan, and 8 g of potassium sulfate (0.5% diluted solution) were added simultaneously continuously to the reactor over 100 minutes. After completion of the addition, the mixture was further reacted for 60 minutes to complete the polymerization. Thus, a latex including a polymer particle having a core-shell structure was obtained.

The polymerization conversion ratio was 98.9% and the average particle diameter of the polymer particle was 0.5 μm. And the weight average molecular weight was 1.05 million.

Preparation Example 4

190.15 g of ion exchanged water, 0.015 g of didodecyl sodium sulfosuccinate, 0.001 g of n-dodecyl mercaptan, 0.8 g of sodium dicarbonate ($NaHCO_3$), 5.5 g of butyl acrylate and 5.5 g of methyl methacrylate were added to a 3 L four-neck reactor equipped with a stirrer, a thermometer, a nitrogen feeder and a circulating condenser to make an emulsion. While maintaining the temperature in the reactor at 75° C. and replacing the reactor to a nitrogen atmosphere, 0.05 g of potassium sulfate was added thereto. After checking the heating temperature, the mixture was reacted for 120 minutes to produce a core polymer.

While maintaining the temperature in the reactor at 75° C., a mixture consisting of 77 g of butyl methacrylate, 77 g of methyl methacrylate, 0.1 g of didodecyl sodium sulfosuccinate and 0.063 g of n-dodecylmercaptan, and 20 g of potassium sulfate (0.5% diluted solution) were added simultaneously continuously to the reactor over 320 minutes. After completion of the addition, the mixture was further reacted for 60 minutes to complete the core polymerization.

In order to prepare a final polymer particle, while maintaining the temperature in the reactor at 75° C., a mixture consisting of 35.75 g of butyl methacrylate, 14.85 g of methyl methacrylate, 4.4 g of methacrylic acid, 0.01 g of didodecyl sodium sulfosuccinate and 0.036 g of n-dodecylmercaptan, and 10 g of potassium sulfate (0.5% diluted solution) were added simultaneously continuously to the reactor over 120 minutes. After completion of the addition, the mixture was further reacted for 60 minutes to complete the polymerization. Thus, a latex including a polymer particle having a core-shell structure was obtained.

The polymerization conversion ratio was 90.1% and the average particle diameter of the polymer particle was 1 μm. And the weight average molecular weight was 1.09 million.

Preparation Example 5

190.15 g of ion exchanged water, 0.135 g of didodecyl sodium sulfosuccinate, 0.001 g of n-dodecyl mercaptan, 1.1 g of ethyl acrylate and 9.9 g of methyl methacrylate were added to a 3 L four-neck reactor equipped with a stirrer, a thermometer, a nitrogen feeder and a circulating condenser to make an emulsion. While maintaining the temperature in the reactor at 75° C. and replacing the reactor to a nitrogen atmosphere, 0.05 g of potassium sulfate was added thereto. After checking the heating temperature, the mixture was reacted for 120 minutes to produce a core polymer.

While maintaining the temperature in the reactor at 75° C., a mixture consisting of 15.4 g of ethyl acrylate, 138.6 g of methyl methacrylate, 0.11 g of didodecyl sodium sulfosuccinate and 0.067 g of n-dodecylmercaptan, and 24 g of potassium sulfate (0.5% diluted solution) were added simultaneously continuously to the reactor over 320 minutes. After completion of the addition, the mixture was further reacted for 60 minutes to complete the core polymerization.

In order to prepare a final polymer particle, while maintaining the temperature in the reactor at 75° C., a mixture consisting of 5.5 g of ethyl acrylate, 22 g of methyl methacrylate, 27.5 g of butyl acrylate, 0.008 g of didodecyl sodium sulfosuccinate and 0.0029 g of n-dodecylmercaptan, and 8 g of potassium sulfate (0.5% diluted solution) were added simultaneously continuously to the reactor over 100 minutes. After completion of the addition, the mixture was further reacted for 60 minutes to complete the polymerization. Thus, a latex including a polymer particle having a core-shell structure was obtained.

The polymerization conversion ratio was 98.9% and the average particle diameter of the polymer particle was 0.15 μm. And the weight average molecular weight was 1.15 million.

Preparation of Super Absorbent Polymer

Example 1

500 g of acrylic acid, 3 g of ethoxylated(15) trimethylolpropanetriacrylate and 0.04 g of diphenyl(2,4,6-trimethylbenzoyl)-phosphine oxide were added and dissolved, to which 896.4 g of 24.5% sodium hydroxide solution was added to produce an aqueous solution of the water-soluble unsaturated monomer while feeding nitrogen continuously. The aqueous solution of the water-soluble unsaturated monomer was cooled down to 70° C. 500 g of this aqueous solution was added to a stainless steel container of 250 mm width, 250 mm length and 30 mm height and then the UV polymerization was carried out by irradiating an ultraviolet ray (irradiation dose: 10 mV/cm$^2$) to the solution for 90 seconds to obtain a hydrogel polymer. The hydrogel polymer thus obtained was pulverized into a size of 2 mm*2 mm. Then, the moisture content was measured and the result was 40.1%.

The obtained hydrogel polymer was spread on a stainless wire gauze having a hole size of 600 μm to a thickness of about 30 mm, and dried in a hot air oven at 160° C. for 5 hours. The dried polymer was pulverized by using a pulverizing machine and then size-classified through a standard sieve according to ASTM standard to obtain a base resin powder having a particle size of 150 to 850 μm.

100 parts by weight of the base polymer powder was added to a vessel equipped with a stirrer and a double jacket, and stirred until the base polymer powder reached 25° C. Then, a mixed solution (25° C.) of 1.0 g of ethylene carbonate, 4.0 g of water, 0.01 g of the polymer particle produced in Preparation Example 1 (based on the weight of the polymer particle, mixed in a latex state), 0.3 g of oxalic acid and 0.02 g of silica was added and mixed for one minute and then surface-treated in a hot air oven at 175° C. for 60 minutes. The surface-treated powder was size-classified through a standard sieve according to the ASTM standard to obtain a super absorbent polymer powder having a particle size of 150 to 850 μm.

Example 2

The super absorbent polymer powder was obtained substantially according to the same method as in Example 1, except that 0.1 g of the polymer particle obtained in Preparation Example 1 (based on the weight of the polymer particle, mixed in a latex state) was used.

Example 3

The super absorbent polymer powder was obtained substantially according to the same method as in Example 1, except that 0.01 g of the polymer particle obtained in Preparation Example 2 (based on the weight of the polymer particle, mixed in a latex state) was used.

Example 4

The super absorbent polymer powder was obtained substantially according to the same method as in Example 1, except that 0.1 g of the polymer particle obtained in Preparation Example 2 (based on the weight of the polymer particle, mixed in a latex state) was used.

Example 5

The super absorbent polymer powder was obtained substantially according to the same method as in Example 1, except that 0.01 g of the polymer particle obtained in Preparation Example 3 (based on the weight of the polymer particle, mixed in a latex state) was used.

Example 6

The super absorbent polymer powder was obtained substantially according to the same method as in Example 1, except that 0.1 g of the polymer particle obtained in Preparation Example 3 (based on the weight of the polymer particle, mixed in a latex state) was used.

Example 7

The super absorbent polymer powder was obtained substantially according to the same method as in Example 1, except that 0.01 g of the polymer particle obtained in Preparation Example 4 (based on the weight of the polymer particle, mixed in a latex state) was used.

Example 8

The super absorbent polymer powder was obtained substantially according to the same method as in Example 1, except that 0.1 g of the polymer particle obtained in Preparation Example 4 (based on the weight of the polymer particle, mixed in a latex state) was used.

Comparative Example 1

100 parts by weight of the base polymer powder obtained in Example 1 was added to a vessel equipped with a stirrer and a double jacket, and stirred until the base polymer powder reached 25° C. Then, a mixed solution of 1.0 g of ethylene carbonate, 4.0 g of water, 0.3 g of oxalic acid and 0.02 g of silica was added and mixed for one minute and then surface-treated in a hot air oven at 175° C. for 60 minutes. The surface-treated powder was size through a standard sieve according to the ASTM standard to obtain a super absorbent polymer powder having a particle size of 150 to 850 μm.

Comparative Example 2

The super absorbent polymer powder was obtained substantially according to the same method as in Example 1, except that 0.1 g of the polymer particle obtained in Preparation Example 5 (based on the weight of the polymer particle, mixed in a latex state) was used.

Comparative Example 3

100 parts by weight of the base polymer powder obtained in Example 1 was added to a vessel equipped with a stirrer and a double jacket, and stirred until the base polymer powder reached 70° C. Then, a mixed solution (25° C.) of 1.0 g of ethylene carbonate, 4.0 g of water, 0.1 g of the polymer particle produced in Preparation Example 2 (based on the weight of the polymer particle, mixed in a latex state), 0.3 g of oxalic acid and 0.02 g of silica was added and mixed for one minute and then surface-treated in a hot air oven at 175° C. for 60 minutes. The surface-treated powder was size-classified through a standard sieve according to the ASTM standard to obtain a super absorbent polymer powder having a particle size of 150 to 850 μm.

Comparative Example 4

100 parts by weight of the base polymer powder obtained in Example 1 was added to a vessel equipped with a stirrer and a double, jacket, stirred until the base polymer powder reached 25° C. and then heated up to 70° C. A mixed solution of 1.0 g of ethylene carbonate, 4.0 g of water, 0.1 g of the polymer particle produced in Preparation Example 2 (based on the weight of the polymer particle, mixed in a latex state), 0.3 g of oxalic acid and 0.02 g of silica was added and mixed for one minute and then surface-treated in a hot air oven at 175° C. for 60 minutes. The surface-treated powder was size-classified through a standard sieve according to the ASTM standard to obtain a super absorbent polymer powder having a particle size of 150 to 850 μm.

The surface treatment conditions of Examples and Comparative Examples are listed in the following Table 1.

T., "Modern Superabsorbent Polymer Technology," John Wiley & Sons (1998), page 161).

More specific measurement method is described as follows. From the super absorbent polymer (hereinafter, referred to as "sample") prepared in Examples and Comparative Examples, 0.2 g of a particle having a particle diameter of 300 to 600 μm was taken and added to a prepared cylinder, to which 50 g of 0.9% saline solution was added and left for 30 minutes. Then, the weight of 0.3 psi was put on the super absorbent polymer to which 0.9% saline solution was absorbed, and left for one minute. And then, the time that 0.9% saline solution passed from the upper limit line to the lower limit line marked beforehand on the cylinder was measured after opening the stopcock at the bottom of the cylinder. Every measurement was carried out at the temperature of 24±1° C. and the relative humidity of 50±10%.

The passage time from the upper limit line to the lower limit line was measured for every sample and the passage time without addition of the super absorbent polymer (SAP) was measured. Thus, the permeability was calculated according to the following Equation 1:

TABLE 1

| | | Polymer particles | | | | |
|---|---|---|---|---|---|---|
| | Preparation Example | Average particle size (μm) | Glass transition termperature of core polymer (° C.) | Glass transition termperature of shell polymer (° C.) | Addition amount (part by weight) | Temperature of base polymer (° C.) | Temperature of surface crosslinking solution (° C.) |
| Example 1 | Preparation Example 1 | 0.1 | 22 | 98 | 0.01 | 25 | 25 |
| Example 2 | Preparation Example 1 | 0.1 | 22 | 98 | 0.1 | 25 | 25 |
| Example 3 | Preparation Example 2 | 0.25 | 26 | 60 | 0.01 | 25 | 25 |
| Example 4 | Preparation Example 2 | 0.25 | 26 | 60 | 0.1 | 25 | 25 |
| Example 5 | Preparation Example 3 | 0.5 | 34 | 50 | 0.01 | 25 | 25 |
| Example 6 | Preparation Example 3 | 0.5 | 34 | 50 | 0.1 | 25 | 25 |
| Example 7 | Preparation Example 4 | 1 | 7 | 52 | 0.01 | 25 | 25 |
| Example 8 | Preparation Example 4 | 1 | 7 | 52 | 0.1 | 25 | 25 |
| Comparative Example 1 | No addition | — | — | — | — | 25 | 25 |
| Comparative Example 2 | Preparation Example 5 | 0.25 | 94 | −4 | 0.1 | 25 | 25 |
| Comparative Example 3 | Preparation Example 2 | 0.25 | 26 | 60 | 0.1 | 70 | 25 |
| Comparative Example 4 | Preparation Example 2 | 0.25 | 26 | 60 | 0.1 | 25 | 70 |

Experimental Example

Measurement and Comparison of Permeability, Water Holding Capacity and Absorption Power Under Pressure The permeability was measured by using 0.9% salt water solution under the load of 0.3 psi according to the method disclosed in the literature (Buchholz, F. L. and Graham, A.

Penetrability (sec)=Time (sample)−Time (without SAP)  [Equation 1]

The water holding capacity was measured according to EDANA WSP 241.2 method. 0.2 g of the sample classified through a 30-50 mesh was placed into a tea bag and immersed into 0.9% saline solution. After 30 minutes, the bag was drained of water by a centrifugal force of 250 G with a centrifugal separator for 3 minutes, and then the weight of the bag was measured. Thus, the amount of saline solution held in the super absorbent polymer was determined. In this manner, the water holding capacity was measured.

The absorption power under pressure was measured according to EDANA WSP 242.2 method. Specifically, 0.9 g of the sample having a particle size of 850 to 150 μm was uniformly distributed in a cylinder defined in the EDANA method and then pressurized with the pressure of 21 g/cm$^2$ by using a piston and a weight. Then, the absorption power under pressure was calculated as the amount to which 0.9% saline solution was absorbed for one hour.

Measurement of Saline Flow Conductivity and Free Swell Gel Bed Permeability

The saline flow conductivity (SFC) was measured according to the method disclosed in [0184]-[0189] in column 16 of US Patent Publication No. 2009-0131255.

The free swell gel bed permeability (GBP) was measured according to the method disclosed in [0065] in column 6 through [0077] in column 7 of US Patent Publication No. 2010-0261812.

The physical properties of the super absorbent polymers of Examples and Comparative Examples are listed in the following Table 2.

TABLE 2

| | Water holding capacity (g/g) | Absorption power under pressure (g/g) | Permeability (sec) | Saline flow conductivity (cm$^3$ * sec * $10^{-7}$/g) | Free swell gel bed permeability (cm$^2$) |
|---|---|---|---|---|---|
| Example 1 | 30.1 | 24.4 | 35 | 50.2 | 188 * $10^{-9}$ |
| Example 2 | 31.1 | 24.8 | 19 | 59.2 | 252 * $10^{-9}$ |
| Example 3 | 31.2 | 25.4 | 23 | 54.1 | 196 * $10^{-9}$ |
| Example 4 | 31.3 | 24.8 | 10 | 71.2 | 404 * $10^{-9}$ |
| Example 5 | 31.0 | 25.4 | 12 | 62.4 | 352 * $10^{-9}$ |
| Example 6 | 30.8 | 24.5 | 8 | 79.5 | 496 * $10^{-9}$ |
| Example 7 | 31.0 | 25.3 | 9 | 71.8 | 395 * $10^{-9}$ |
| Example 8 | 31.2 | 24.4 | 6 | 89.8 | 585 * $10^{-9}$ |
| Comparative Example 1 | 30.9 | 25.5 | 77 | 39.3 | 91 * $10^{-9}$ |
| Comparative Example 2 | 30.7 | 22.6 | 171 | 14.9 | 49 * $10^{-9}$ |
| Comparactive Example 3 | 30.8 | 23.7 | 82 | 37.1 | 64 * $10^{-9}$ |
| Comparative Example 4 | 30.9 | 23.8 | 100 | 31.3 | 61 * $10^{-9}$ |

Referring to Table 2 above, it could be seen that the super absorbent polymer prepared in accordance with the method of the present invention as in Examples 1 to 8 exhibited excellent permeability properties. Comparative Example 1 in which the polymer particle was not used was not satisfactory in permeability properties.

On the other hand, when the glass transition temperature of the shell portion of the polymer particle is low as in Comparative Example 2, the permeability properties were not good due to the adhesiveness of the polymer particles. Also, in the case of Comparative Example 3 and 4, when the temperature of the base polymer is higher than the glass transition temperature of the shell portion of the polymer particle, or when the temperature of the surface crosslinking solution is higher than the glass transition temperature of the shell portion of the polymer particle, a phenomenon similar to Comparative Example 2 occurs and thereby excellent permeability properties could not be expected.

Generally, when the permeability is high, the water holding capacity and the absorption power under pressure tend to be lowered. That is, when the degree of crosslinking is high and the strength of the hydrogel is high, the permeability is high. Therefore, there is a difficulty in increasing a water holding capacity, an absorption power under pressure and a permeability simultaneously. However, it could be seen from the results of Examples and Comparative Examples that the super absorbent polymer prepared by the method of the present invention has not only high water holding capacity and absorption power under pressure but also high permeability. It can be analyzed that these results are shown because the polymer particles added during a surface crosslinking reaction is placed on the surface of the polymer particles and the hydrogel polymer particles agglomerate with each other, thereby increasing the permeability.

What is claimed is:

1. A method for preparing a super absorbent polymer, comprising the steps of:
   thermally polymerizing or a photopolymerizing of a monomer composition including a water-soluble ethylene-based unsaturated monomer and a polymerization initiator to form a hydrogel polymer;
   drying the hydrogel polymer;
   pulverizing the dried hydrogel polymer;
   mixing the pulverized dried hydrogel polymer with a surface crosslinking agent and a polymer particle having a core-shell structure; and
   crosslinking a surface of the pulverized dried hydrogel polymer in the presence of the polymer particle,
   wherein, in the polymer particle, a glass transition temperature (Tg) of a polymer forming the core of the polymer particle is lower than a glass transition temperature (Tg) of a polymer forming the shell of the polymer particle.

2. The method according to claim 1, wherein the step of mixing the pulverized dried hydrogel polymer with the surface crosslinking agent and the polymer particle having the core-shell structure at a temperature of the pulverized polymer and the surface crosslinking agent that is lower than the glass transition temperature (Tg) of the polymer forming the shell portion of the polymer particle.

3. The method according to claim 1, wherein the polymer particle having the core-shell structure has an average particle diameter of 0.01 μm to 10 μm.

4. The method according to claim 1, wherein the polymer particle includes one or more selected from the group consisting of (meth)acrylate-based, (meth)acrylic acid-based, styrene-based, and diene-based polymers.

5. The method according to claim 1, wherein the polymer particle is mixed in a ratio of 0.001 to 2 parts by weight based on 100 parts by weight of the pulverized dried hydrogel polymer.

6. The method according to claim 1, wherein the polymer particle is in a latex form dispersed in water.

7. The method according to claim 1, wherein the cross-linking step is performed at a temperature ranging from 140 to 220° C.

8. The method according to claim 1, wherein the super absorbent polymer has a permeability of 60 seconds or less.

9. The method according to claim 1, wherein the super absorbent polymer has a water holding capacity of 25 to 35 g/g, and an absorption power under pressure of 17 to 27 g/g.

* * * * *